(12) United States Patent
Malivoir

(10) Patent No.: US 11,111,085 B2
(45) Date of Patent: Sep. 7, 2021

(54) MANIPULATOR FOR PIVOTING AN OBJECT OF MANIPULATION

(71) Applicant: TMT TAPPING-MEASURING-TECHNOLOGY SARL, Luxembourg (LU)

(72) Inventor: Philippe Malivoir, Errouville (FR)

(73) Assignee: TMT TAPPING-MEASURING-TECHNOLOGY SARL, Luxembourg (LU)

( * ) Notice: Subject to any disclaimer, the term of this patent is extended or adjusted under 35 U.S.C. 154(b) by 0 days.

(21) Appl. No.: 16/345,347

(22) PCT Filed: Dec. 6, 2016

(86) PCT No.: PCT/EP2016/079818
§ 371 (c)(1),
(2) Date: Apr. 26, 2019

(87) PCT Pub. No.: WO2018/103821
PCT Pub. Date: Jun. 14, 2018

(65) Prior Publication Data
US 2019/0300295 A1    Oct. 3, 2019

(51) Int. Cl.
*B65G 47/90*    (2006.01)
*B25J 11/00*    (2006.01)
(Continued)

(52) U.S. Cl.
CPC .............. *B65G 47/904* (2013.01); *B25J 9/04* (2013.01); *B25J 9/109* (2013.01); *B25J 11/00* (2013.01)

(58) Field of Classification Search
CPC ............ B65G 47/904; B25J 9/04; B25J 9/109
(Continued)

(56) References Cited

U.S. PATENT DOCUMENTS

| 2,811,267 | A | | 10/1957 | Bock et al. | |
| 6,007,292 | A | * | 12/1999 | Crandell | ........... H01L 21/67742 |
| | | | | | 414/744.6 |
| 2015/0336266 | A1 | * | 11/2015 | Kfoury | .................. B25J 9/1065 |
| | | | | | 74/490.05 |

FOREIGN PATENT DOCUMENTS

| CA | | 2375872 A1 | * | 12/2000 | .............. B25J 9/109 |
| JP | WO 2012/070547 | | * | 5/2012 | .............. B25J 9/109 |

(Continued)

*Primary Examiner* — Ronald P Jarrett
(74) *Attorney, Agent, or Firm* — Dickinson Wright PLLC; Andrew D. Dorisio

(57) ABSTRACT

The invention relates to a manipulator (10) for pivoting an object of manipulation, the manipulator (10) having a frame comprising a pivot base which can be pivoted in a horizontal plane about a vertical pivot axis (11) relative to the frame by means of a drive (26), the pivot base having a boom (20) comprising a load carrier (15) which is disposed at a free end of the boom (20) and serves to be connected to the object of manipulation, the load carrier (15) having a pivot device for pivoting the object of manipulation in the horizontal plane, wherein, in order to produce a pivoting four-bar linkage formed in the horizontal plane and comprising the boom (20), a control bar (24) extending from the frame to the pivot device is provided, one end of the control bar (24) being articulated to the pivot device of the load carrier (15) and the other end being articulated to the frame via a control gear mechanism in such a manner that in the event of a base pivoting movement of the pivot base, a load carrier pivoting movement superimposed on the base pivoting movement is effected via the control gear mechanism and the control bar (24).

13 Claims, 3 Drawing Sheets

Figure 1:
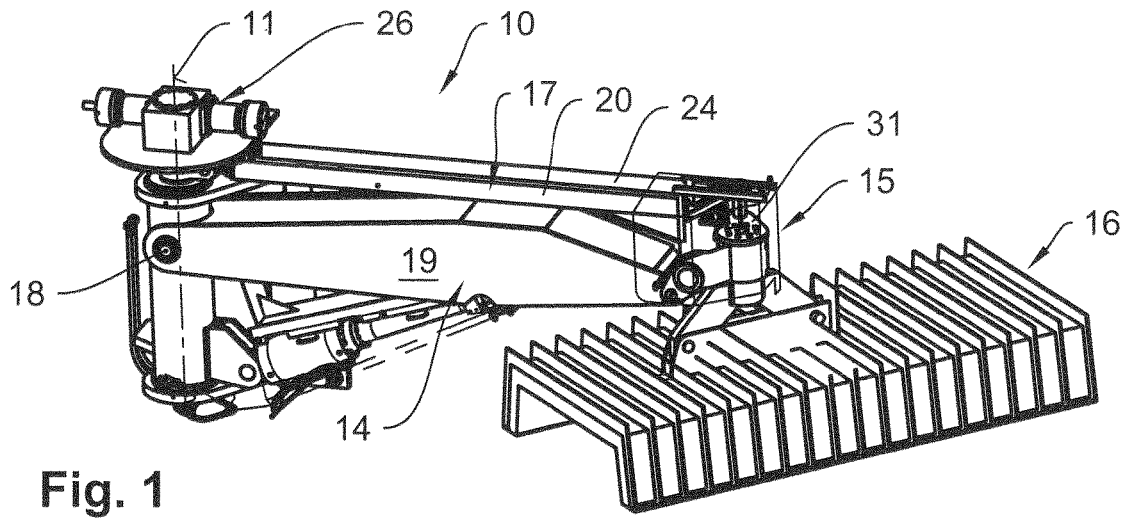

(51) Int. Cl.
*B25J 9/10* (2006.01)
*B25J 9/04* (2006.01)

(58) Field of Classification Search
USPC .......................................... 414/744.1–744.8
See application file for complete search history.

(56) References Cited

FOREIGN PATENT DOCUMENTS

| WO | WO2006057821 A2 | 6/2006 |
| WO | 2012070547 A1 | 5/2012 |

\* cited by examiner

MANIPULATOR FOR PIVOTING AN OBJECT OF MANIPULATION

FIELD OF THE INVENTION

The invention relates to a manipulator for pivoting an object of manipulation, the manipulator having a frame comprising a pivot base which can be pivoted in a horizontal plane about a vertical pivot axis relative to the frame by means of a drive, the pivot base having a boom comprising a load carrier which is disposed at a free end of the boom and serves to be connected to the object of manipulation, the load carrier having a pivot device for pivoting the object of manipulation in the horizontal plane, wherein, in order to produce a pivoting four-bar linkage formed in the horizontal plane and comprising the boom, a control bar extending from the frame to the pivot device is provided, one end of the control bar being articulated to the pivot device of the load carrier and the other end being articulated to the frame via a control gear mechanism in such a manner that in the event of a base pivoting movement of the pivot base, a load carrier pivoting movement superimposed on the base pivoting movement is effected via the control gear mechanism and the control bar.

BACKGROUND OF THE INVENTION

Manipulators of the kind mentioned above are used in particular to handle tapping channel lids in the immediate periphery of a blast furnace or also to handle drill mounts of tap hole drilling devices. Additional devices, such as a tap hole plugging machine, which are required for operating the blast furnace and are also located in the immediate periphery of the blast furnace and are disposed on both sides of the tapping channel lead to particularly cramped conditions during handling. For instance, after having been lifted from the tapping channel, a tapping channel lid will have to be transferred into a resting position to the side of the tapping channel, a pivoting movement superimposed on the base pivoting movement having to be carried out during pivoting of the pivot base of the manipulator so as to avoid collision with the tap hole drilling device or the tap hole plugging device, for example.

Hence, in the case of manipulators used thus far for said handling, the load carrier disposed at the free end of a boom and provided for being connected to the object of manipulation has to be provided with another pivot drive in addition to a pivot drive of the pivot base of the manipulator that allows the boom disposed on the pivot base to pivot relative to a frame of the manipulator. Aside from the fact that disposing the additional pivot drive on the load carrier will lead to an increase in the weight load acting on the boom, the pivot drive disposed on the load carrier is also subject to particular thermal stress especially when it is used for handling tapping channel lids because the tapping channel lids have a high temperature due to the heat radiated by the red-hot steel discharged from the tap hole of the blast furnace, said high temperature, in turn, acting from the tapping channel lid on the pivot drive because of heat conduction and thermal radiation. This high thermal load results in correspondingly high maintenance work and—if damage occurs—high repair work, which interferes with the smooth running of the blast furnace.

Hence, the object of the present invention is to propose a manipulator of the kind mentioned above that requires less maintenance.

To attain this object, the manipulator according to the invention has the features of claim 1.

SUMMARY OF THE INVENTION

According to the invention, in order to produce a pivoting four-bar linkage formed in the horizontal plane, a control bar extending from the frame to the pivot device is provided, one end of said control bar being articulated to the pivot device of the load carrier and the other end being articulated to the frame via a control gear mechanism in such a manner that in the event of a base pivoting movement of the pivot base, a load carrier pivoting movement superimposed on the base pivoting movement is effected via the control gear mechanism and the control bar.

Via the gear mechanism, the manipulator configured according to the invention enables the load carrier to undergo a pivoting movement that is coupled to the pivoting movement of the pivot base relative to the frame, which means that the drive provided for pivoting the pivot base can also be used to pivot the load carrier, the control gear mechanism ensuring that the pivoting movement of the load carrier can take place ahead of or following or opposite the pivoting movement of the pivot drive, thus allowing the load carrier and the object of manipulation connected to the load carrier to be in different pivoted positions than the pivot base. The control gear mechanism allows control of the pivoted positions of the object of manipulation connected to the load carrier; for example, said control can prevent collisions of the object of manipulation with an object disposed in the area of the pivoting path, such as a tap hole plugging device or a tap hole drilling device, by pivoting a corner of the object of manipulation, which extends substantially flat in the in the horizontal plane, against the pivoting movement of the pivot base in the collision zone or by pivoting it with a greater speed of rotation so that the object of manipulation can be moved past the object without collision.

Accordingly, using the control gear mechanism, not only the pivoting direction but also the speed of rotation of the load carrier and of the tapping channel lid connected thereto can be set via a function which is set by the control gear mechanism and by which the pivoting movement depends on the pivoting movement of the pivot drive.

In a preferred embodiment, the control gear mechanism has a guide formed on the frame and interacting with a control lever formed on the pivot base, said control lever articulating the control bar to the guide, which means not only that the control function can be superimposed on the load carrier by means of the control gear mechanism, but also that the control lever additionally ensures secure transmission of the control forces.

If the guide defines a control curve along which a control head of the control lever is guided, the pivoting movement of the load carrier can be easily adjusted to the given collision conditions on site by individually defining the control curve.

Preferably, the control curve is a guiding groove into which the control head, which is a driver, engages, which means that the control curve can be designed in a manner that is robust and mechanically simple to implement.

Preferably, the guide is a control disk that is connected to the frame, which in particular allows the control gear mechanism to be adjusted to the particular collision conditions on site by simply changing the control disk.

Preferably, the control lever is a lever rocker having a lever axis fixed to the pivot base for pivot-mounting the control lever in a pivot plane parallel to the guide plane of the guide, a first lever arm of the control lever forming a control lever arm whose end is engaged with the guide via the control head, and a second lever arm being a driving lever arm which forms a driving member of the pivoting four-bar linkage.

If the lever axis is disposed above the boom on the pivot base and intersects a longitudinal axis of the parallel boom, a pivoting four-bar linkage defined in the horizontal plane is realized despite the positions of the lever axis of the control lever and of the pivot axis of the boom differing from each other on the pivot base.

Preferably, the control gear mechanism has a pivot carrier connected to the pivot base, the guide connected to the frame, and the control lever connected to the pivot carrier via the lever axis, so that a particularly compact design of the control gear mechanism is possible.

In a particularly preferred embodiment of a manipulator, which is particularly suitable for handling tapping channel lids, the boom is articulated to the pivot base via a pivot axis and is disposed parallel to a load arm articulated to the pivot base via a pivot axis, the boom and the load arm being articulated to each other at their ends opposite the pivot base via the load carrier, in order to form a lifting linkage that has an articulated lifting parallelogram formed in a vertical plane.

In order to produce the pivoting four-bar linkage as an articulated pivoting parallelogram, the boom is preferably disposed parallel to the control bar, thus enabling kinematics that exhibit particularly low wear.

Preferably, the pivot axis of the boom and the lever axis of the control lever are formed together on the pivot carrier.

In a particularly preferred embodiment, the drive serves both to pivot the lifting linkage and to pivot the pivot device of the load carrier.

If the drive is disposed on the guide and in particular on the guide that is a control disk, both the transmission of the driving force to the pivot and the transmission of the driving force to the control lever can happen across a shortest possible distance, allowing the use of drive trains or the like to be avoided.

Figure 7:
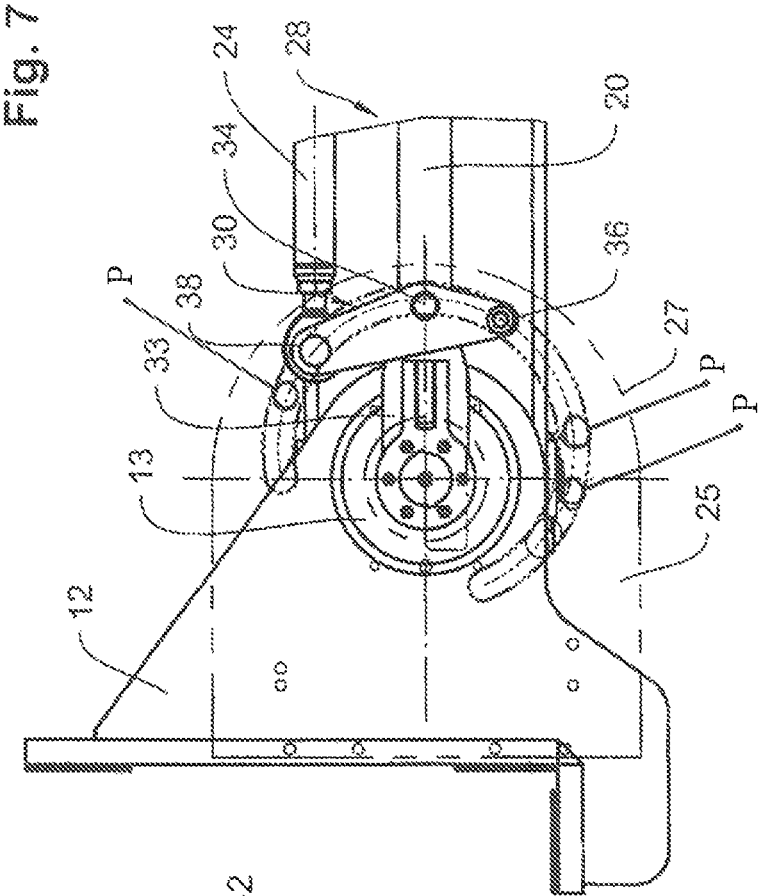
Figure 6:
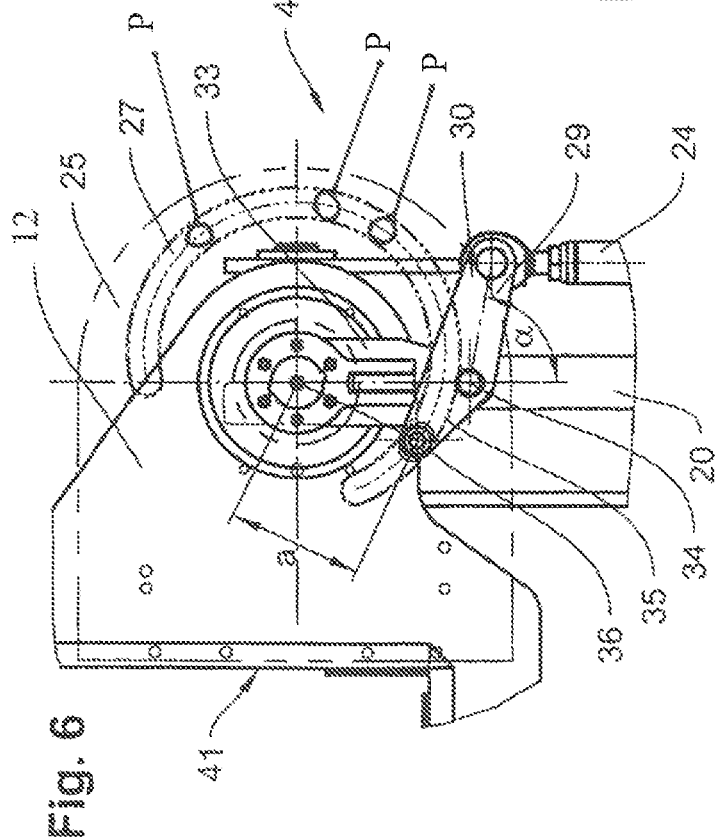

In a particularly preferred embodiment, the control curve is designed in such a manner that the control curve defines a sequence of control points P, as illustrated in FIGS. 6 and 7, whose distance from the vertical pivot axis of the pivot base defines a parallelogram angle formed between the driving member and the fixed member of the horizontal articulated parallelogram, said fixed member being defined by the distance between the lever axis and the pivot axis of the load carrier.

BRIEF DESCRIPTION OF THE DRAWING FIGURES

Hereinafter, a preferred embodiment of the invention will be explained with more detail based on the drawing.

Figure 2:
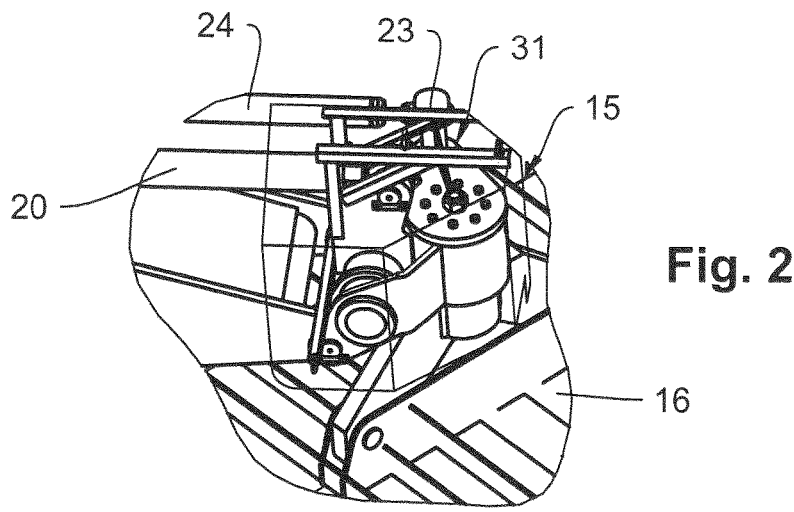
Figure 3:
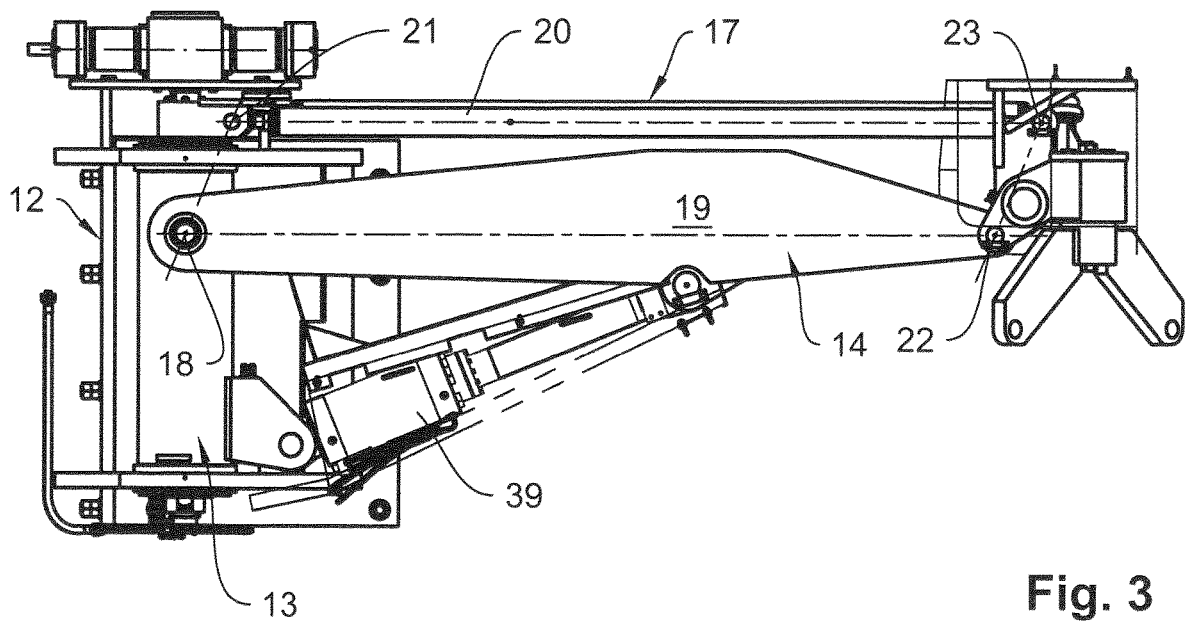
Figure 5:
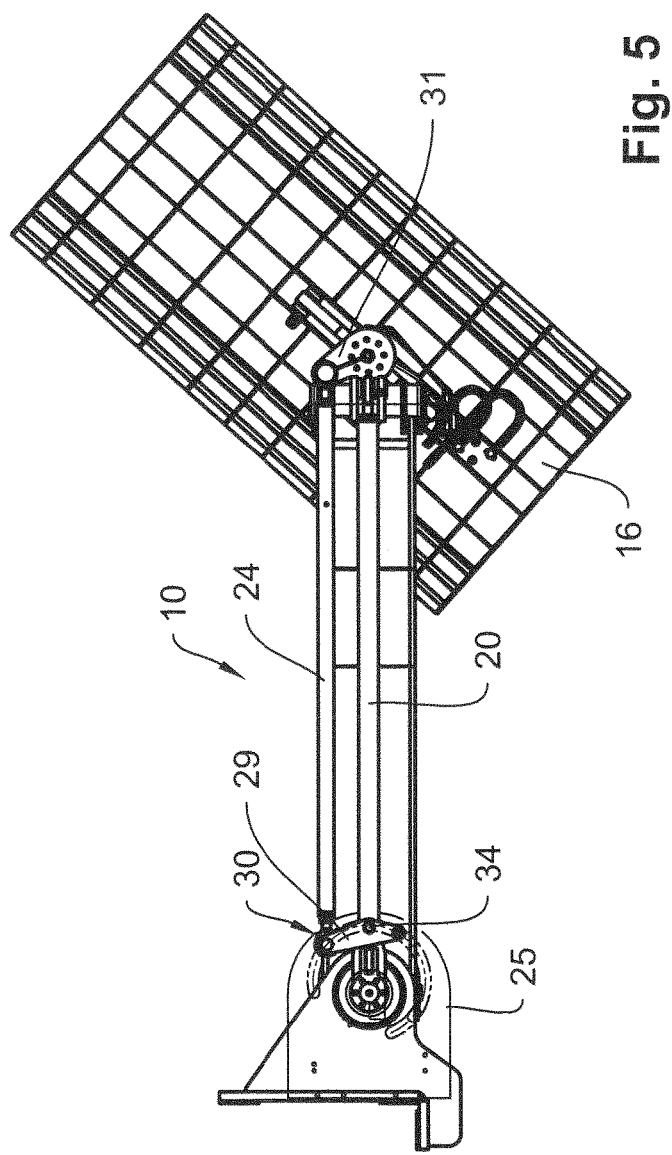
Figure 4:
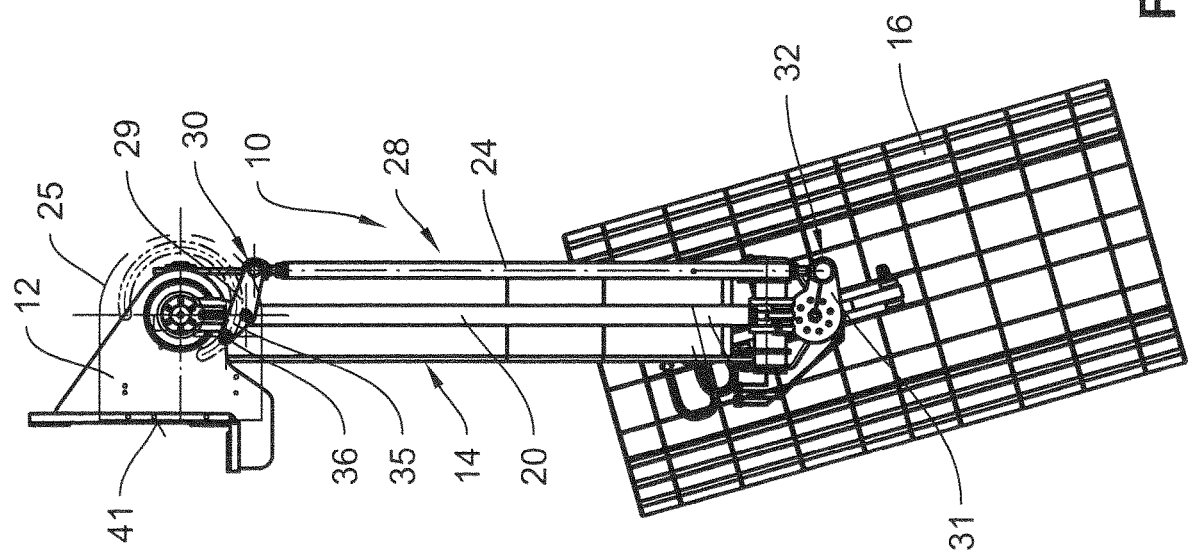
Figure 8:
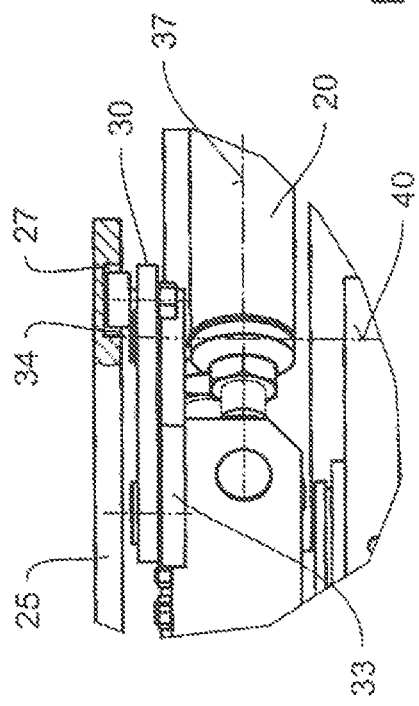

FIG. 1: shows a manipulator in an isometric illustration;
FIG. 2: shows an enlarged illustration of a load carrier of the manipulator;
FIG. 3: shows a side view of the manipulator;
FIG. 4: shows a top view of the manipulator as illustrated in FIG. 3 in a first pivoted position;
FIG. 5: shows a top view of the manipulator as illustrated in FIG. 3 in a second pivoted position;
FIG. 6: shows an enlarged illustration of a control gear mechanism of the manipulator disposed in the pivoted position illustrated in FIG. 4;
FIG. 7: shows an enlarged illustration of the control gear mechanism of the manipulator illustrated in the second pivoted position in FIG. 5;
FIG. 8: shows an enlarged illustration of the control gear mechanism of the manipulator illustrated in FIG. 3.

DETAILED DESCRIPTION OF THE INVENTION

FIG. 3 shows a side view of a manipulator 10 illustrated isometrically in FIG. 1, said manipulator 10 having a pivot base 13 which is mounted so as to pivot about a vertical pivot axis 11 in a frame 12, said pivot base 13 being provided with a lifting linkage 14 which, at its free end, has a load carrier 15 for being connected to a tapping channel lid 16, which is illustrated as an object of manipulation by way of example in this case.

Lifting linkage 14 has an articulated lifting parallelogram 17 which can be pivoted in a vertical plane and which has a load arm 19 articulated to pivot base 13 via a pivot axis 18 and, parallel to said load arm 19, a boom 20 which is also articulated to pivot base 13 via a pivot axis 21. At their ends opposite pivot base 13, load arm 19 and boom 20 are articulated to load carrier 15 via pivot axes 22 and 23, respectively, thus forming articulated lifting parallelogram 17, which is best seen from the auxiliary lines interconnecting pivot axes 18 and 21, 21 and 23, 23 and 22, and 22 and 18 as illustrated in FIG. 3, said articulated lifting parallelogram 17 allowing a pivoting movement in a vertical plane for lifting or lowering tapping channel lid 16, which is connected to load carrier 18, load carrier 15 moving in parallel alignment to a "fixed member" of articulated lifting parallelograms 17, said fixed member being defined by pivot base 13 between pivot axes 18 and 21, tapping channel lid 16 thus maintaining its horizontal alignment during the lifting movement.

For performing the lifting movement, a lifting cylinder 39, which is illustrated in FIGS. 1 and 3, is provided between pivot base 13 and load arm 19.

In FIGS. 4 and 5, manipulator 10 is illustrated in two different pivoted positions, FIG. 4 showing a first pivoted position, in which lifting linkage 14, which is connected to pivot base 13, is aligned substantially parallel to a mounting plate 41, which is formed on a rear side of frame 12, in a horizontal pivot plane, which coincides with the drawing plane in this case.

For better illustration of a control gear mechanism 42 that acts on a control bar 24 disposed parallel to boom 20 of articulated lifting parallelogram 17 in this case, a control disk 25 is transparently illustrated in manipulator 10 shown in FIG. 4 and FIG. 5. On control disk 25, which is part of frame 12 or permanently connected thereto, a drive 26 for the pivot drive of pivot base 13 is disposed.

As can be seen in FIG. 4 and FIG. 5, in the case of the illustrated preferred embodiment of a manipulator for handling a tapping channel lid 16, boom 20 and control bar 24 form parallel articulated members of a pivoting four-bar linkage that is disposed in the horizontal plane and configured as an articulated pivoting parallelogram 28 whose other parallel articulated members are formed by a driving lever arm 29 of a control lever 30 and by a pivot arm 31 of a pivot device 32 of load carrier 15.

As becomes clear from a combined view of FIGS. 6, 7 and 8, in particular, control lever 30 is mounted to pivot on a lever axis 34 on a pivot carrier 33 disposed on and permanently connected to pivot base 13 and forms a lever rocker in such a manner that a first lever arm of control lever 30 forms the driving lever arm and a second lever arm of control lever 30 forms a control lever arm 35 which has, at its free end, a driver 36 that engages into a guiding groove 27 formed on the underside of control disk 25. As shown in FIG. 8, in particular, lever axis 34 of the control lever formed on pivot carrier 33 is located above boom 20 in such a manner that a centerline 40 of lever axis 34 intersects a longitudinal axis 37 of boom 20. Thus, a fixed member of articulated pivoting parallelogram 28 disposed in the horizontal plane is kinematically formed between lever axis 34 and a vertical pivot axis 38 of pivot device 32 of load carrier 15.

As is apparent from a combined view of FIGS. 7 and 8, in particular, control gear mechanism 42 has, as substantial components, pivot carrier 33 rigidly connected to pivot base 13 and thus pivotable together with pivot base 13, the guide formed as a guiding groove 27 on frame 12 or on control disk 25 disposed for co-rotation on frame 12, and control lever 30 articulated to pivot carrier 33 via lever axis 34. As shown in FIG. 7, control bar 24 is connected to driving lever arm 29 via a swivel joint 38, formed as a spherical head in this case, which means that a lifting movement of lifting linkage 14, i.e. a pivoting of articulated lifting parallelogram 17 in a vertical plane, does not lead to constraints in swivel joint 38. In fact, pivoting of pivot device 32 of pivot carrier 33, which causes corresponding pivoting of tapping channel lid 16, is envisaged only if articulated pivoting parallelogram 28 is disposed in the horizontal plane.

As can best be comprehended from FIGS. 4 and 5, to pivot pivot arm 31 of pivot device 32 of load carrier 15, driving lever arm 29 formed by the first lever arm of control lever 30 acts on pivot arm 31 of pivot device 32 via control bar 24 moved parallel to boom 20. The pivoting movement of driving member 29 is effected by pivoting of control lever arms 35 of control lever 30 about lever axis 34. The pivoting movement of control lever arm 35 is effected by the relative movement of driver 36 in guiding groove 27 when pivot base 13 is being pivoted about vertical pivot axis 11 in guiding groove 27. Thus, control gear mechanism 23 driven by means of the pivoting movement of pivot base 13 effects a relative rotation of tapping channel lid 16, which is connected to pivot device 32 of load carrier 15, relative to lifting linkage 14, which means that the rotation of pivot device 32 of load carrier 15 in the horizontal plane is superimposed on the pivoting movement of lifting linkage 14, which is connected to pivot base 13, in the horizontal plane, a parallelogram angle α formed between driving lever arm 29, which forms the driving member of articulated pivoting parallelogram 28, and load arm 19 being dependent on distance a between driver 36 and vertical pivot axis 11.

Although guide 27 is in the shape of a partial circle whose circle center is offset from vertical pivot axis 11 in the illustrated embodiment, guiding groove 27 or a control curve of control gear mechanism 42 configured as the guiding groove in the case at hand can have an irregular progression provided with alternating curvature radii, said progression being definable according to the desired relative movement of load carrier 15 relative to lifting linkage 14; load carrier 15 can also perform opposite rotation movements that follow each other.

The invention claimed is:

1. A manipulator (10) for pivoting an object of manipulation, the manipulator (10) having a frame (12) comprising a pivot base (13) which can be pivoted in a horizontal plane about a vertical pivot axis (11) relative to the frame (12) by means of a drive (26), the pivot base having a boom (20) comprising a load carrier (15) which is disposed at a free end of the boom (20) and serves to be connected to the object of manipulation, the load carrier (15) having a pivot (32) for pivoting the object of manipulation in the horizontal plane, wherein, in order to produce a four-bar linkage being pivotable in its entirety in the horizontal plane and comprising the boom (20), a control bar (24) extending from the frame (12) to the pivot (32) is provided, one end of the control bar (24) being articulated to the pivot (32) of the load carrier (15) and the other end being articulated to the frame (12) via a control gear (42) in such a manner that in the event of a base pivoting movement of the pivot base (13), a load carrier pivoting movement superimposed on the base pivoting movement is effected via the control gear (42) and the control bar (24);

wherein the control gear (42) has a guide formed on the frame (12), said guide interacting with a control lever (30) which is disposed on the pivot base (13) and articulates the control bar (30) to the guide; and wherein the control lever (30) forms a lever rocker having a lever axis (34) fixed to the pivot base (13) for pivot-mounting the control lever (30) in a pivot plane parallel to the guide plane of the guide, the control lever comprising a control lever arm (35), whose end is engaged with the guide via the control head, and further comprising a driving lever arm (29) forming a driving member of the pivoting four-bar linkage.

2. The manipulator according to claim 1, characterized in that the guide defines a control curve along which a control head of the control lever (30) is guided.

3. The manipulator according to claim 2, characterized in that the control curve is a guiding groove (27) into which the control head, which is a driver (36), engages.

4. The manipulator according to claim 2, characterized in that the control curve defines a sequence of control points whose distance (a) from the vertical pivot axis (11) of the pivot base (13) defines a parallelogram angle (a) formed between the driving member and the fixed member of the articulated pivoting parallelogram (28).

5. The manipulator according to claim 1, characterized in that the guide is a control disk (25) which is connected to the frame (12).

6. The manipulator according to claim 1, characterized in that the lever axis (34) is disposed above the boom (20) on the pivot base (13) and intersects a longitudinal axis (37) of the boom (20).

7. The manipulator according to claim 1, characterized in that the control gear (42) comprises a pivot carrier (33) connected to the pivot base (13), the guide connected to the frame (12), and the control lever (30) connected to the pivot carrier (33) via the lever axis (34).

8. The manipulator according to claim 7, characterized in that the pivot axis (21) of the boom (20) is formed on the pivot carrier (33) together with the lever axis (34) of the control lever (30).

9. The manipulator according to claim 1, characterized in that in order to form a lifting linkage (14) which has an articulated lifting parallelogram (17) formed in a vertical plane, the boom (20) is articulated to the pivot base (13) via a pivot axis (21) and disposed parallel to a load arm (19) articulated to the pivot base (13) via a pivot axis (18), the boom (20) and the load arm (19) being articulated to each other via the load carrier (15) at their ends opposite the pivot base (13).

10. The manipulator according to claim 9, characterized in that in order to realize the pivoting four-bar linkage as an articulated pivoting parallelogram (28), the boom (20) is disposed parallel to the control bar (24).

11. The manipulator according to claim 9, characterized in that the drive (26) serves both to pivot the lifting linkage (14) and to pivot the pivot (32) of the load carrier (15).

12. The manipulator according to claim 11, characterized in that the drive (26) is disposed on the guide.

13. A manipulator (10) for pivoting an object of manipulation, the manipulator (10) having a frame (12) comprising a pivot base (13) which can be pivoted in a horizontal plane about a vertical pivot axis (11) relative to the frame (12) by means of a drive (26), the pivot base having a boom (20) comprising a load carrier (15) which is disposed at a free end of the boom (20) and serves to be connected to the object of manipulation, the load carrier (15) having a pivot (32) for pivoting the object of manipulation in the horizontal plane, wherein, in order to produce a four-bar linkage being pivotable in its entirety in the horizontal plane and comprising the boom (20), a control bar (24) extending from the frame (12) to the pivot (32) is provided, one end of the control bar (24) being articulated to the pivot (32) of the load carrier (15) and the other end being articulated to the frame (12) via a control gear (42) in such a manner that in the event of a base pivoting movement of the pivot base (13), a load carrier pivoting movement superimposed on the base pivoting movement is effected via the control gear (42) and the control bar (24);

wherein in order to form a lifting linkage (14) which has an articulated lifting parallelogram (17) formed in a vertical plane, the boom (20) is articulated to the pivot base (13) via a pivot axis (21) and disposed parallel to a load arm (19) articulated to the pivot base (13) via a pivot axis (18), the boom (20) and the load arm (19) being articulated to each other via the load carrier (15) at their ends opposite the pivot base (13).

\* \* \* \* \*